Jan. 18, 1927.
B. H. GERKER
1,614,725
SPARE TIRE AND FENDER PROTECTOR
Original Filed Oct. 19, 1925   2 Sheets-Sheet 1
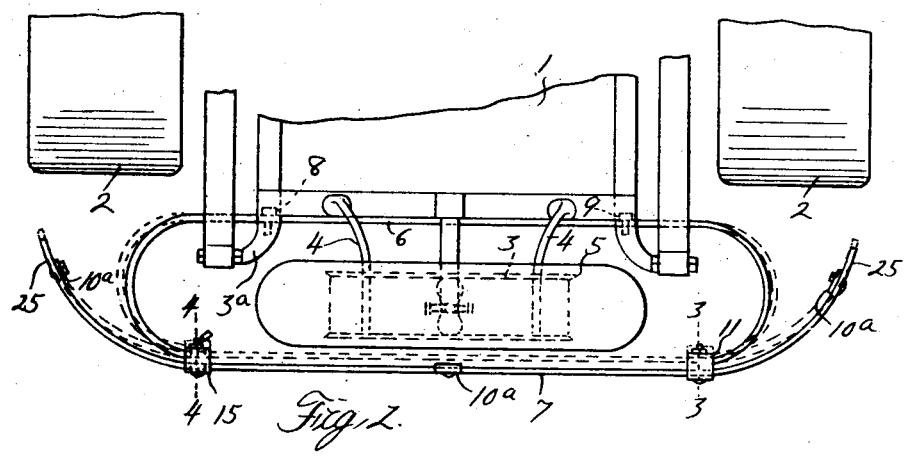
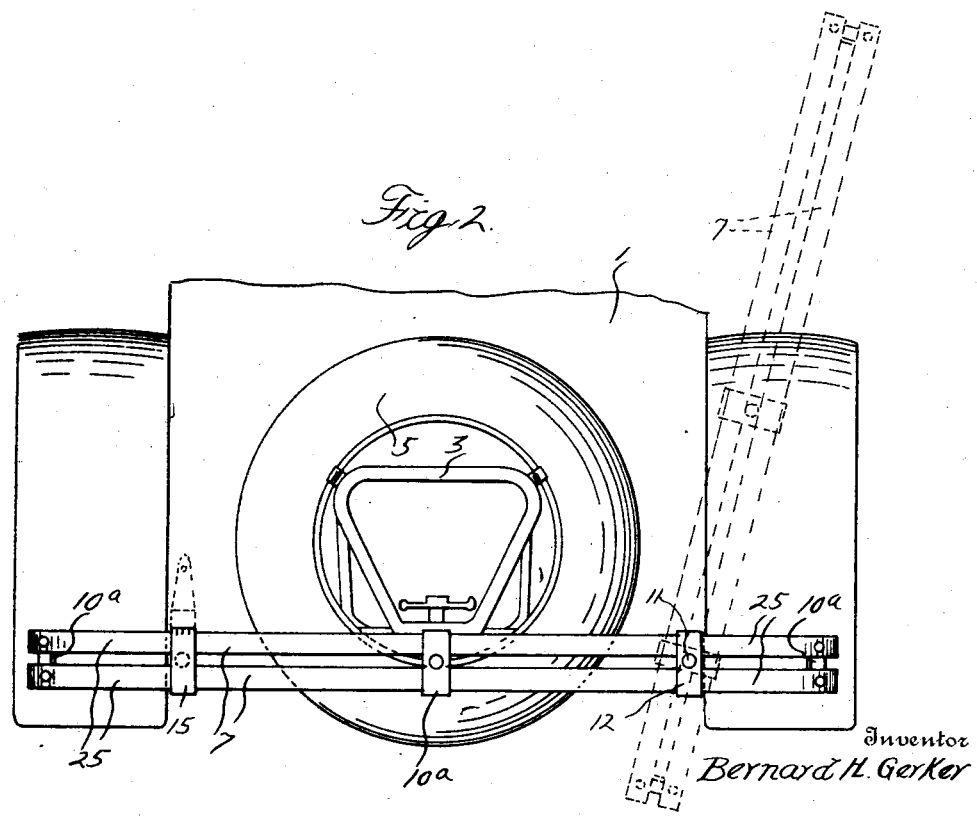
Inventor
Bernard H. Gerker
By J. J. Murray
Attorney Jan. 18, 1927.  
B. H. GERKER  
1,614,725  
SPARE TIRE AND FENDER PROTECTOR  
Original Filed Oct. 19, 1925  2 Sheets-Sheet 2
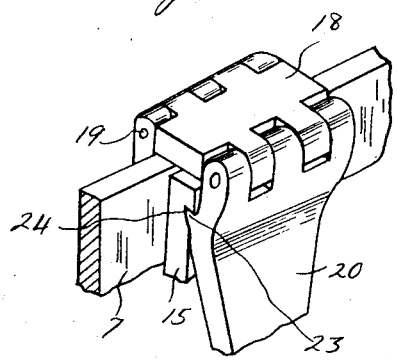
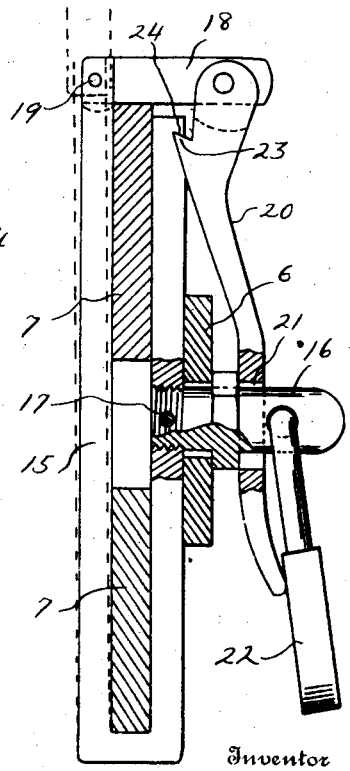
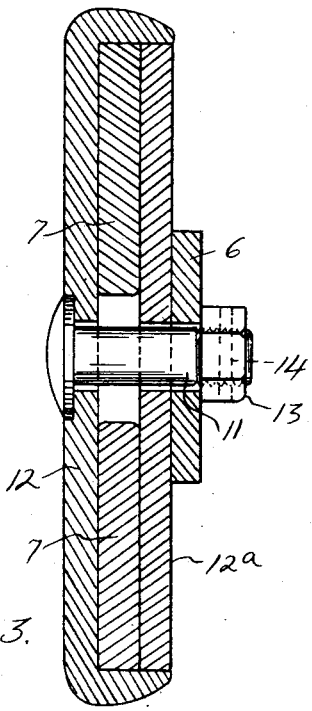
Inventor  
Bernard H. Gerker Patented Jan. 18, 1927.

1,614,725

UNITED STATES PATENT OFFICE.

BERNARD H. GERKER, OF DETROIT, MICHIGAN.

SPARE-TIRE AND FENDER PROTECTOR.

Application filed October 19, 1925, Serial No. 63,316. Renewed October 21, 1926.

This invention relates to devices for protecting a spare tire mounted upon the back of a vehicle from theft and injury, and further relates to devices for protecting the rear fenders of motor vehicles from damage.

It is an object of the invention to derive from a single structure the functions of safeguarding a spare tire, carried by a vehicle, against theft and injury, and of protecting the rear fenders against damage.

Another object is to provide a device of the aforesaid character comprising two parts, one of which is carried by the other, and is adjustable to provide for removal of a protected tire, and is normally locked in its position of use.

A further object is to provide a novel latch mechanism for retaining said adjustable part normally in its position of use, and for taking up lost motion, and eliminating rattle.

These and various other objects are attained by the construction hereinafter described and illustrated in the accompanying drawings, wherein:

Fig. 1 is a plan view of the rear portion of a motor vehicle showing a spare tire carried thereby and showing the present invention applied to protect said tire and the rear fenders of said vehicle.

Fig. 2 is the rear view of the same.

Fig. 3 is a vertical sectional view taken upon the line 3—3 of Fig. 1, and disclosing the pivotal mounting of the adjustable part of the protective device.

Fig. 4 is a vertical sectional view taken upon the line 4—4 of Fig. 1, and showing the means for latching and locking the adjustable member of said device.

Fig. 5 is a fragmentary perspective view of a portion of the latch mechanism.

In these views the reference character 1 designates a motor vehicle body having the rear fenders 2, and having upon its rear end an ordinary spare tire carrier 3, secured to the frame 3ª of the vehicle by one or more arms 4, and carrying a tire 5. As is true in the case of practically all makes of spare tire carriers now in use, a considerable rearward shifting of a tire is necessary to effect its removal from the disclosed carrier.

The protective device which constitutes the present invention, comprises front and rear parts 6 and 7, the former stationary upon the vehicle, and the latter adjustable upon the former. The part 6 is preferably a bar of spring steel extending across the rear end of the vehicle and secured to the frame 3ª at points 8 and 9. The end portions of said bar curve semi-circularly rearward, serving as shock absorbers and terminally carrying the adjustable part 7. The latter in its disclosed form, comprises a pair of bars, preferably formed of spring steel, and suitably connected and spaced apart by plates 10ª. The part 7 is pivoted upon a bolt 11 by means of a pair of clamping plates 12 oppositely engaging the bars of said part, and mounted in one end of the bar 6. Said bolt has one end headed against the rear plate 12 and its other end carries a nut 13, removal of which is prevented by a pin 14 passed through said nut and bolt, and terminating flush with the surface of the nut.

The other end of the bar 6 carries an upwardly opening U-shaped keeper 15, preferably formed of spring metal, clamped to said bar by a cap-screw 16, removal of which is prevented by a pin 17 passed through said keeper and cap-screw. Said screw projects forwardly some distance beyond the part 6 for a purpose to be presently explained. In its position of use, the part 7, is adapted to be received by said keeper and to be retained therein by a plate 18 having one extremity pivoted as indicated at 19 upon one of the spaced upper ends of the keeper. To the other extremity of said plate, there is pivoted one end of a locking lever 20 which in the position of use of said plate, is adapted to swing downwardly, as shown in full lines in Fig. 4, to engage an aperture 21 of said lever with the elongated head of the bolt 16. The walls of said keeper tend to diverge slightly, as indicated in dash lines in Fig. 4, so as to readily admit the part 7. 22 designates an ordinary padlock applicable to the headed end of the cap-screw 16 to hold said lever engaged with the head of said screw. The end portions 25 of the part 7 project sufficiently beyond the pivot bolt 11 and keeper 15 to form guards for the rear fenders 2, said portions being preferably curved forwardly toward said fenders.

Adjacent to its pivotal end, the lever 20 is formed with a wedge-shaped rib 23, engageable, in the lowered position of said lever, in a transverse groove 24 in the front face of the keeper 15 to take up any lost motion and maintain a downward pressure of the plate 18 upon the part 7. Furthermore, said rib acts as a fulcrum member for the lever as the latter is swung down, so as to cause the walls of the keeper to be drawn toward each other, and into clamping engagement with the bars 7 by such actuation of the lever.

In the use of the described construction, when the part 7 is locked in its lowered position, its projecting ends 25 serve as guards for the rear fenders 2 and its intermediate portion protects the spare tire 5 not only against injury in the event of the rear end of the car being bumped by some other vehicle, but also against theft since it is impossible to remove the tire from its carrier 3 when said member 7 is in the described position. That is to say, in said position, the member 7 extends too close to said tire to permit such rearward shifting of the tire as is requisite for its removal from the carrier.

Authorized removal of the tire may be accomplished in the usual manner after the padlock 22 has been detached, permitting the plate 18 (together with the lever 20) to be swung to uncover the keeper 15, thus allowing swinging of the part 7 to the dash line position shown in Fig. 2, or to any other position allowing removal of the tire.

Furthermore the members 6 and 7 together form a yieldable bumper which acts to absorb shocks in the event that a vehicle equipped with the invention suffers a rear end collision, the rounded ends of the bar 6 being under such conditions distorted as indicated in dash lines in Fig. 1.

Thus it will be seen that the described device exercises the function of any ordinary rear end bumper and furthermore protects the spare tire from collision and theft, as is not accomplished by an ordinary bumper, and presents a still further utility in that its projecting end portions form guards for the rear fenders.

When the part 7 is in its locked position, it is clamped by the keeper 15 with sufficient firmness to positively avoid any rattle.

What I claim is:

1. In a device of the character described, the combination with a vehicle and a tire carrier upon the rear end thereof, of a bumper comprising a front part mounted upon the vehicle forwardly of the tire carrier and a rear part movably mounted upon said front part, and extending across and rearwardly of the tire carrier in such proximity to said carrier as to prevent rearward removal of a tire therefrom, and means for locking the rear part to the front part.

2. In a device of the character described, the combination with a vehicle and a tire carrier upon the rear end thereof, of a bumper comprising a front part secured to the vehicle with its ends at opposite sides of the tire carrier, and further comprising a rear part pivoted upon one end portion of said forward part, and adapted to extend across the tire carrier in close proximity to a tire thereupon and engageable with the other end portion of said front part, and means for locking said rear part to the last mentioned end portion of the forward part.

3. In a device of the character described, the combination with the vehicle having rear fenders, and a tire carrier upon said vehicle, of a bumper comprising parts extending across the vehicle forwardly and rearwardly of said tire carrier, the rear part being movable with respect to the front part, said bumper further comprising fender guards extending laterally from one of said parts, and means for locking the rear part to the front part.

4. In a device of the character described, the combination with a vehicle having rear fenders, and a tire carrier upon said vehicle, of a bumper comprising a front part fixed upon said vehicle and a rear part mounted upon said front part, and extending normally across the tire carrier in such proximity to a tire thereon as to prevent removal of said tire, and having end portions extending beyond said front portion and forming guards for said fenders, said rear part being movable relative to said front part to provide for authorized removal of the tire, and means for locking the rear part to the front part.

5. A tire carrier as set forth in claim 4, the rear part being pivotal upon one end of the front part.

6. A tire carrier as set forth in claim 1, the end portion of the front part being rearwardly curved to mount the rear part and being resiliently yieldable to absorb shocks.

7. A tire carrier as set forth in claim 1, the end portions of the front part being rearwardly curved and resiliently yieldable for absorbing shocks, and the rear portion being pivoted upon one of said end portions.

8. A tire carrier as set forth in claim 1, the end portions of one of the said bumper parts being curved toward the other and being resiliently yieldable to absorb shocks.

9. In a device of the character described, the combination with a vehicle and a tire carrier upon the rear end thereof, of a protector for a tire upon said carrier, pivoted upon the vehicle at one side of said tire carrier and extending across said carrier, a U-shaped keeper carried by the vehicle at the other side of said carrier, into and out of which keeper said protector is movable about its pivotal axis and means for locking said protector in said keeper.

10. In a device of the character described, the combination with a vehicle and a tire carrier upon the rear end thereof, of a protector for a tire upon said carrier pivoted upon the vehicle at one side of said carrier, and normally extending across said carrier, a U-shaped keeper carried by the vehicle at the other side of the carrier and receiving said protector in its normal position, a pivotal member upon said keeper for retaining the protector in the keeper, a lever extending from said pivotal member and having a portion entering into a latch engagement with the keeper to hold said member in retaining position, and means for locking said lever in its latched position.

11. In a device of the character described, the combination with a vehicle and a tire carrier thereupon, of a protector for a tire upon said carrier normally extending across said carrier in such proximity to a tire thereupon as to prevent removal of said tire, said protector being movable to permit authorized removal of the tire, a keeper receiving said protector in the normal position of the protector, a fastening member mounting said keeper upon the vehicle, a latch lever engageable with said fastening member for securing the protector in said keeper, and means for locking said latch member in engagement with the fastening member.

12. In a device of the character described, the combination with a vehicle and a tire carrier upon the rear end thereof, of a protector for a tire upon said carrier pivoted upon the vehicle at one side of said carrier and normally extending across said carrier, a resilient keeper carried by the vehicle at the other side of the carrier of substantially a U-shape, having its walls normally slightly diverged to readily admit said protector, a pivotal member upon said keeper for retaining the protector in the keeper, a lever extending from said pivotal member and fulcrumed upon said keeper to draw the walls of the keeper into clamping engagement with the protector therein, and means for locking said lever in its keeper closing position.

13. In a device of the character described, the combination with a vehicle having rear fenders, and a tire carrier upon said vehicle, of a bumper bar extending across the vehicle rearwardly of said tire carrier, and coacting with the tire carrier to prevent removal of a tire thereupon, forwardly yieldable supports for said bumper bar mounted upon the vehicle, one at each side of said carrier, means pivoting said bar upon one of said supports, means for locking said bar to the other of said supports, said bar having portions extending laterally of the vehicle beyond said pivot means, and locking means, said portions forming guards for said rear fenders.

14. In a device of the character described, the combination with a vehicle having rear fenders, and a tire carrier upon said vehicle, of a bumper bar extending across the vehicle rearwardly of the tire carrier, and co-acting with said carrier to prevent removal of a tire on said carrier, a pair of laterally bowed resiliently yieldable supports for said bar mounted upon the vehicle one at each side of said tire carrier, means pivoting said bar upon one of said supports, and means for locking said bar to the other of said supports, the said bar having portions extending laterally of the vehicle beyond said pivot means and locking means forming guards for said rear fenders.

In testimony whereof I sign this specification.

BERNARD H. GERKER.